United States Patent

Rokhvarger et al.

[11] Patent Number: 6,054,700
[45] Date of Patent: Apr. 25, 2000

[54] PROCESS AND APPARATUS FOR JOINING THICK-WALLED CERAMIC PARTS

[75] Inventors: Anatoly E. Rokhvarger, Brooklyn, N.Y.; Adam B. Khizh, Hackensack, N.J.

[73] Assignee: Nucon Systems, New York, N.Y.

[21] Appl. No.: 09/058,912

[22] Filed: Apr. 10, 1998

Related U.S. Application Data

[60] Provisional application No. 60/043,120, Apr. 10, 1997.

[51] Int. Cl.[7] ................ H05B 6/72; H05B 6/80
[52] U.S. Cl. ............ 219/759; 219/695; 219/697; 219/746; 219/762; 156/272.2; 264/432
[58] Field of Search ............... 219/759, 695, 219/697, 745, 746, 748, 752, 753, 754, 762; 156/69, 272.2, 379.6; 264/432; 425/174, 174.4 R, 174.4 E

[56] References Cited

U.S. PATENT DOCUMENTS

| | | | |
|---|---|---|---|
| 4,434,341 | 2/1984 | Busby | 219/697 |
| 4,437,578 | 3/1984 | Bienek et al. | 220/256 |
| 4,456,806 | 6/1984 | Arimatsu | 219/762 |
| 4,529,857 | 7/1985 | Meek et al. | 219/10.55 M |
| 4,593,168 | 6/1986 | Amada | 219/10.55 M |
| 4,606,748 | 8/1986 | Blake et al. | 65/36 |
| 4,673,782 | 6/1987 | Kopke et al. | 219/746 |
| 4,757,172 | 7/1988 | Palaith | 219/10.55 M |
| 4,767,902 | 8/1988 | Palaith et al. | 219/10.55 M |
| 4,772,770 | 9/1988 | Matsui et al. | 219/686 |
| 4,792,348 | 12/1988 | Pekarsky | 65/36 |
| 4,847,009 | 7/1989 | Madle et al. | 252/633 |
| 4,939,033 | 7/1990 | Daussan et al. | 428/331 |
| 5,072,087 | 12/1991 | Apte et al. | 219/759 |

OTHER PUBLICATIONS

Willard H. Sutton "Microwave Processing of Materials" MRS Bulletin, Nov. 1993 pp. 22–63.
Bibliography of Articles.

*Primary Examiner*—Philip H. Leung
*Attorney, Agent, or Firm*—Milde, Hoffberg & Macklin, LLP

[57] ABSTRACT

A process for joining ceramic parts comprises autoclaving a powdered ceramic composition to increase its hydrogen form contents to a concentration that serves to increase the composition's absorption of microwave energy during subsequent heating of the ceramic parts; coating the autoclaved ceramic composition on the surfaces of the parts to be joined together; and placing the coated surfaces of the parts to be joined together and focusing microwave energy at the joint between the parts in order to seal the joint by refiring and rereacting the parts, the microwave energy being of sufficient power and being uniformly applied to the joint for a sufficient period of time to seal the joint. An apparatus for joining ceramic parts with microwaves comprises a microwave ring furnace capable of encircling a joint area between ceramic parts having a circular cross section; at least one microwave guide attached to the microwave ring furnace with a microwave source connected to the microwave guide; and a rotation table for rotating the joint area of the ceramic parts within the microwave ring furnace.

41 Claims, 2 Drawing Sheets

PROCESS AND APPARATUS FOR JOINING THICK-WALLED CERAMIC PARTS

This application claims benefit of provisional application Ser. No. 60/043,120 filed Apr. 10, 1997.

BACKGROUND OF THE INVENTION

The present invention relates to a novel method for joining ceramic parts. In one embodiment, the invention is concerned with a process for joining a lid on a containment vessel after it has been filled with nuclear or other hazardous waste.

U.S. Pat. No. 4,437,578, granted Mar. 20, 1984, discloses a method for closing with a cover a container for the final storage of radioactive substances, wherein at least one of the container and cover consists of a material selected from ceramic and metallic material, and wherein the container and cover are suitably ground on their seating areas which cooperate with each other; and when the container is closed the cover is held by prestressing on the seating area of the container. The method may include a step after grinding, of applying a thin equalizing layer of highly corrosion resistant, deformable material to at least one of the seating areas of the container and cover. The material for the layer may be a deformable ceramic.

U.S. Pat. No. 4,529,857, granted Jul. 16, 1985, discloses a method of producing a ceramic-glass-ceramic seal comprising the steps of mixing a slurry of glass sealing material and coupling agent, applying said slurry to a plurality of ceramic workpieces for sealing; surrounding said slurry and plurality of ceramic workpieces with an insulative material; microwaving said slurry and plurality of ceramic workpieces at a power, time and frequency sufficient to cause a liquid phase reaction in said slurry; and allowing said slurry and plurality of ceramic workpieces, to cool, thereby securing a ceramic-glass-ceramic seal.

U.S. Pat. No. 4,606,748, granted Aug. 19, 1986, discloses a method for producing a ceramic-glass-ceramic seal by the use of microwave energy, and a sealing mixture which comprises a glass sealing material, a coupling agent, and an oxidizer. Sodium nitrate is the most preferred oxidizer. The seal produced is said to exhibit greater strength due to its different microstructure.

U.S. Pat. No. 4,757,172, granted on Jul. 12, 1988, discloses a method for joining together two nonoxide ceramic items which involves a preliminary step of either creating a vacuum or overpressurizing a cavity, followed by the steps of applying microwave radiation to the ceramic items, simultaneously applying compressive forces to the ceramic items in order to force such ceramic items together, and continually monitoring the joint being formed between the two ceramic items. An apparatus of four basic elements carries out the method. These elements are a vacuum/overpressurization system, a single mode microwave applicator, a compressive force applicator, and a nondestructive evaluator for monitoring the formation of the joint.

U.S. Pat. No. 4,767,902, granted Aug. 30, 1988, discloses a method for joining together two ceramic items which involves the steps of applying microwave radiation to the ceramic items, simultaneously applying compressive forces to the ceramic items in order to force such ceramic items together, and continually monitoring the joint being formed between the two ceramic items. An apparatus of three elements carries out the method. These elements are a single mode microwave applicator, a compressive force applicator, and a nondestructive evaluator for monitoring the formation of the joint.

U.S. Pat. No. 4,772,770, granted Sep. 20, 1988, discloses an apparatus for joining two ceramics using microwave energy, having a cavity resonator in which the ceramics are placed; a microwave-generator means for producing microwave radiation to be introduced into the cavity resonator; a pressurizer for pressing the joining surfaces of the ceramics against each other; and a temperature controller for controlling the temperature distribution of the ceramics in such a way that the temperature of the ceramics at the joining surfaces is highest and rapidly decreases toward the unjoined ends of the ceramics. The microwave-generator may include a microwave oscillator, a klystron amplifier, and an isolator. The temperature controller can be a dielectric heater or a combination of a dielectric heater and a temperature difference-producer.

U.S. Pat. No. 4,792,348, granted Dec. 20, 1988, discloses a method of producing a joint between a beta-alumina electrolyte tube and alpha-alumina flange with a glass bonding agent in a solid annular bead form devoid of additives such as a coupling agent or the like capable of being heated when subjected to microwave energy which comprises utilizing in the heating step a source of microwave energy so as to heat the beta-alumina tube by microwave energy for a time period sufficient to enable the heat generated in the beta-alumina tube to be conducted to the glass bead and the alpha-alumina flange and heat the glass bead to a temperature above the glass deformation point, and allowing the tube to cool to solidify the glass bead in intimately penetrating relation to the surfaces of the beta-alumina tube and alpha-alumina flange engaged thereby so that the glass forms a bond between the beta-alumina tube and the alpha-alumina flange characterized by a fusion of the glass within the engaged beta-alumina and alpha-alumina.

SUMMARY OF THE INVENTION

It is an object of the present invention to provide a leak-proof ceramic joint between ceramic parts.

It is another object of the present invention to provide a novel process for joining ceramic parts having a thickness of at least about 2.5 cm with microwave energy.

It is an object of the present invention to provide a joint between a ceramic lid and a ceramic container holding nuclear or other hazardous material or waste.

It is another object of the present invention to provide a gas-impermeable joint between a ceramic lid and a ceramic container holding nuclear or other hazardous material or waste.

It is a still further object of the present invention to provide a novel microwave apparatus that is suitable for sealing the joint between a ceramic lid and a ceramic vessel that comprise a nuclear or other hazardous material or waste containment system.

These objects, as well as further objects which will become apparent from the discussion that follows, are achieved, in accordance with the present invention, by a process which comprises:

a) autoclaving a particulate ceramic composition to increase its hydrogen form contents to a concentration that serves to increase the composition's absorption of microwave energy during subsequent heating of the ceramic parts, b) coating the autoclaved particulate ceramic composition on the surfaces of the ceramic parts to be joined together, c) placing the coated surfaces of the parts together and focusing microwave energy at the joint between the ceramic parts in order to seal the joint by refiring and rereacting the ceramic composition between the ceramic parts, the microwave energy being of sufficient power and being uniformly applied to the joint for a sufficient period of time to seal the joint.

The invention also comprises:

An apparatus for joining ceramic parts with microwaves which comprises:

(a) a microwave ring furnace capable of encircling a joint area between ceramic parts having a circular cross section, (b) at least one microwave guide attached to the microwave ring furnace, and (c) a microwave source that is connected to the microwave guide.

PREFERRED EMBODIMENTS OF THE INVENTION

Figure 1:
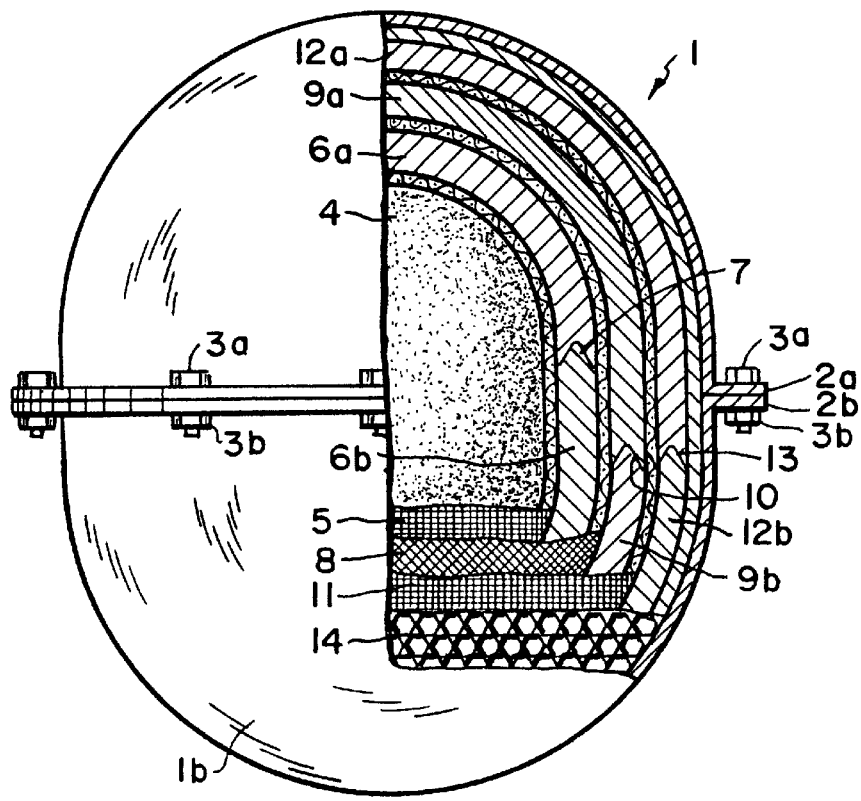
FIG. 1 is a partial one-quarter vertical section of an egg-shaped ceramic container for nuclear or hazardous waste showing the joints in each of the multiple layers of the container.

The process of the invention is capable of joining thick ceramic parts having all sorts of joints, e.g., overlapping, butt, or tongue and groove, etc. It is preferred that the ceramic parts have a thickness of at least about 5 cm. The ceramic parts may be containers vessels and lids therefor formed by extrusion or by vibrocompacting. In a preferred embodiment, the invention is particularly useful for joining a vessel and a lid after microwave energy is applied to the interface and an interlayer particulate ceramic composition between the vessel and the lid. The interlayer composition is capable of joining the vessel and lid after microwave energy is applied to the interface between the vessel and the lid. In certain instances, it may be advisable to have matching ridges and grooves on the mating edges of the ceramic vessels and the ceramic lids.

The ceramic parts may be composed of silicate materials or oxide ceramics, such as kaolin, red clay, mullite, alumina, magnesium oxide, magnesium aluminum spinel, nitride and carbide ceramics, and mixtures thereof. The particulate ceramic composition preferably contains the same components as the ceramic parts. The particle sizes of the particulate ceramic composition mall range from fine grain to coarse grain in size. The particle sizes of the particulate ceramic composition are preferably selected in accordance with the porosity of the ceramic parts to be joined—the bigger the pores in the parts the coarser the grain size that can be used. The converse is also true. The particle sizes of the particulate ceramic composition generally range from about 2 nm to about 2 mm.

The particulate ceramic composition is preferably subjected to a steam autoclave treatment at a steam pressure of up to about 2.5 GPa for a period of time sufficient to introduce hydrogen forms into the ceramic composition.

Generally, the microwave energy is provided at one or more frequencies in the range of about 600 MHZ to about 6000 MHZ. Preferably, the microwave energy is provided at one or more frequencies in the range of about 700 MHZ to about 4000 MHZ, e.g., at a frequency of about 915 MHZ or about 2450 MHZ. In a generally preferred process, the microwave energy is provided at both about 915 MHZ and about 2450 MHZ.

The joint between the parts is preferably surrounded by insulation, which in turn is surrounded by a microwave furnace.

Preferably, where the ceramic parts are in the general form of a cylinder or an egg-shape, they are together rotated about their common axis so that their joint is within the microwave field.

Preferably, the parts to be joined have matching surfaces at their interface. The matching surfaces at their interfacing edges may be flat or beveled. Preferably, the parts to be joined have mating grooves and ridges at their interfacing edges. Those grooves and ridges preferably have a triangular or trapezoidal cross section.

The ceramic containers vessels and lids that may be joined by the process of this invention may be produced by the process described in the U.S. patent application of Anatoly E. Rokhvarger and Adam B. Khizh, entitled "Process and Apparatus for the Preparation of Thick-Walled Ceramic Products," which is being filed concurrently herewith and is incorporated herein by reference. The ceramic containers vessels and lids that may be joined by the process of this invention are described in the U.S. patent application of Anatoly F. Roklivarger and Adam B. Khizh, entitled "Large Size, Thick-walled Ceramic Containers" which is being filed concurrently herewith and is incorporated herein by reference.

Container assembly is a technical process. Considerable quality control is provided to assure precise production. This includes nondestructive evaluation of the ceramic body and finished container parts. Each container vessel is produced together with a matching lid. Vessel and lid parts of the container are produced and preliminary assembly is done separately but within the same production cycle, and the container vessel and lid are supplied to the customer together with a particulate ceramic joining compound. To improve homogeneity of the whole ceramic body, the particulate ceramic joining compound has a composition similar to that of the vessel and the lid. This prevents cracks during thermal expansion when it occurs due to microwave thermal treatment and other impacts during service time.

Preferably, the container vessel and lid have a circular cross section. To assure joining of the container vessel and lid, the joining surfaces area of the cup-vessel and lid-cover are preferably formed as a gear tooth clutch and both joining surfaces are preferably precisely machined over their full joining ring surface. A dense set of micro and macro ridges and grooves may be produced to assure the retention of the powdered ceramic joining compound in the joint. In cross section, the ridges and grooves may be triangular or trapezoidal. Joining of the vessel and its lid is performed at the waste production site after the waste loading and vessel covering procedures. The preferred microwave joining system of the invention has been designed for the vessels and lids.

After loading the contents, e.g., solid nuclear, other hazardous waste products or a combination of nuclear and hazardous waste products into a ceramic container vessel, the vessel is capped and hermetically sealed to prevent any leakage forever. To obtain this goal, a process, a system and a ceramic sealing compound have been developed for the invention.

FIG. 1 is a partial one-quarter vertical section of an egg-shaped ceramic container for nuclear or hazardous waste or mixtures thereof showing the joints in each of the multiple layers of the container. Outer steel protective shell 1 is comprised of upper section 1a and lower section 1b. The sections 1a and 1b have flanges 2a and 2b respectively. Spaced around the flanges 2a and 2b area series of holes that are aligned to accept bolts 3a, which are inserted in each pair of aligned holes and screwed into nuts 3b in order to secure the sections 1a and 1b of the outer protective steel shell 1. Ceramic or metal grain-powder dense pack 4 shrouds a solid radioactive material or radioactive and hazardous waste material (not seen). Pack 4 is contained in wire reinforced metal-foil basket 5. Inner (the first) ceramic lid 6a is shown on top of inner (the first) ceramic vessel 6b. The joint 7 of the container shell, i.e., at the interface of ceramic lid 6a and ceramic vessel 6b, is indicated as a groove in lid 6a and a ridge on vessel 6b. A first metal wire reinforced foil bag 8 surrounds the inner container shell, i.e, 6a and 6b. Surrounding foil bag 8 is intermediate bulk layer comprised of 9a and 9b and made from graphite-boron ore and barite grain-powder mixture. The joint between the upper portion of intermediate bulk layer 9a and lower intermediate bulk layer 9b is indicated as 20. Intermediate bulk layer (9a and 9b) is surrounded by a second metal wire reinforced foil bag 11. An outer (the second) ceramic lid 12a covers an outer (the second) ceramic vessel 12b, and together form a second container shell, having a joint 13 therebetween in the form of a ridge and groove. Surrounding the second container shell is an aluminum honeycomb mitigation layer 14. The aluminum honeycomb mitigation layer 14 is surrounded by temporary or permanent steel sheath (jacket) 1.

To assure container integrity, the ceramic lid has the same physical and chemical properties and wall construction, as the ceramic container vessel. This is achieved by producing the vessel and the lid simultaneously, having them undergo all processes and operations together and keeping them linked as a matched set until they are finally joined in the sealing process. The joining ring area of the container vessel and lid is preferably formed as a clutch.

Figure 2:
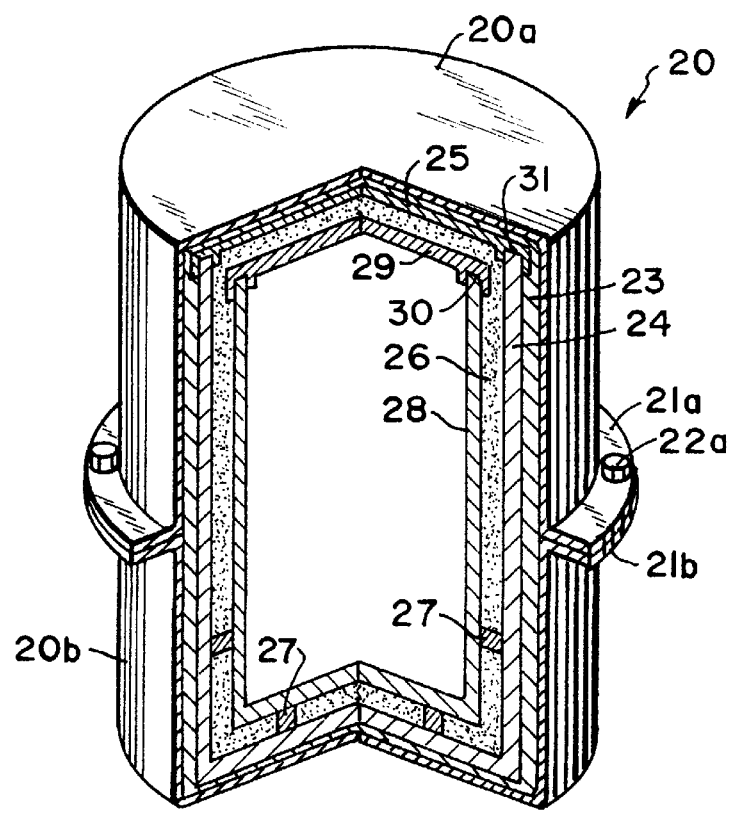
FIG. 2 is a one-quarter perspective view of a cylindrical container showing the joints in each of the multiple layers of the container.

FIG. 2 is a partial one-quarter perspective view of a cylindrical container showing the joints in each of the multiple layers of the container. Outer steel shell 20 is comprised of upper section 20a and lower section 20b. The sections 20a and 20b have flanges 22a and 22b respectively. Spaced around the flanges 22a and 22b are a series of holes that are aligned to accept bolts 22a, which are inserted in each pair of aligned holes and screwed into nuts 22b (nor seen in this view) in order to secure the sections 20a and 20b of the outer protective steel shell 20. The inner ceramic vessel 28 is covered by inner ceramic lid 29. Outer ceramic vessel 24 is covered by outer ceramic lid 25. Ceramic joining compound is at the interface 30 between the vessel 28 and lid 29 and at the interface 31 between the vessel 24 and lid 25. The interface areas 30 and 31 comprise tongues and grooves at the interfaces between the vessels 28 and 29 and their respective lids 24 and 25. An intermediate layer of graphite powder 26 is in the gap between the inner and outer sets of vessels and lids: 28–29 and 24–25. The gap is maintained by means of ceramic stoppers 27. Surrounding the container shell (24–25) is an aluminum honeycomb mitigation layer 23. The aluminum honeycomb mitigation layer 23 is surrounded by temporary or permanent steel sheath (jacket) 20.

Both vessel and lid joining surfaces are preferably machined to obtain a dense set of micro and macro ridges and grooves which makes it possible to absorb and retain a powder of the ceramic joining compound. The ceramic joining compound preferably comprises micro particles similar to the composition of the materials of the ceramic vessels and lids. To reduce processing time and activate microwave induced ceramic sintering (thermal joining and sealing process), the powdered ceramic compound is initially treated in an autoclave at a steam pressure of up to 2.5 GPa and/or carbon micro powder doping is added to the ceramic powder composition mixture. After autoclave treatment, this powdered ceramic compound is dried at 100° C., packed into a plastic bag, and it accompanies the vessel and lid parts of the container to the site of the hazardous waste. At the customer site, immediately before loading the container with waste, the powdered ceramic compound is rubbed into furrow grids of both joining surfaces of the containers and lids.

In order to activate microwave thermal processing of the container exterior surface area and to assure the container cooling process after its microwave thermal treatment, a ceramic refractory and a thermal insulation blanket layer with a thickness up to a few centimeters is applied. This thermal insulation blanket layer is symmetrically positioned around the center of the joint area, and this blanket layer has a height which preferably equals two to three times the thickness of the wall of the ceramic body.

In the embodiment for containers for nuclear or hazardous waste, the thermal insulation blanket is provided to the customer along with the container lid, and it is put on the container vessel and fixed during on-site assembly of the container. Container waste loading and covering are preferably provided on a railroad car platform. This platform allows container rotation which is used to provide uniform thermal treatment. Assembled containers are treated in the microwave thermal system (MWTS) whose construction is shown in the FIGS. 3 and 4.

Figure 3:
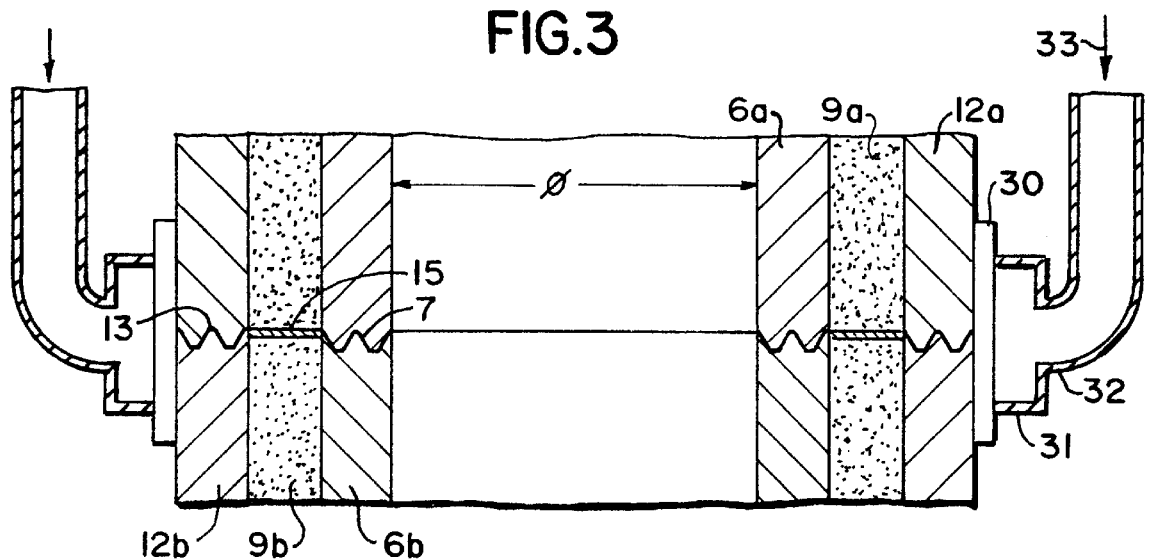
FIG. 3 is a partial cross-sectional view of a microwave thermal system surrounding the joints of an interior and exterior set of ceramic containers vessels and lids which provides integral joining of the vessels and lids of a ceramic container similar to the one shown in FIG. 1.

FIG. 3 is a partial cross-sectional view of a microwave ring furnace 31 which provides integral joining of the vessels 6b and 12b and lids 6a and 12a of ceramic containers similar to the one shown in FIG. 1. Container vessels 6b and 12b are covered by container lids 6a and 12a respectively. The inside diameter of the inner lid 6a is indicated as θ and may be of any convenient dimension to accommodate the contents intended for the containers. The joints 7 and 13 between vessels 6b and 12b and lids 6a and 12a respectively are comprised of double ridges and grooves of trapezoidal cross section. For simplicity, the joints 7 and 13 are shown at the same level. They are preferably at different levels as shown in FIG. 1, with the inner joint 7 at a higher level than the joint 13, thereby allowing access to the joint 7 by the microwave ring furnace 31 when the time comes to seal the joint between the inner ceramic container vessel 6b and lid 6a. The ridges and grooves of joints 7 and 13 are coated with the autoclaved particulate ceramic joining composition of the invention. Between the inner and outer containers (6a–6b and 12a–12b), there is a layer of graphite powder 9a–9b. Resilient stopper metal plate 15 or the end of a metal foil bag 9b maintains the layer of graphite powder 9a in place between the lids 6a and 12a. Thermal insulation ceramic blanket 30 covers the joints 7 and 13 in turn. A cross-sectional view of the ring jacket 31 of the microwave furnace is depicted surrounding the thermal insulation jacket 30. Microwave waveguides 32 on either side of ring furnace 31 are attached to ring furnace 31 and deliver microwave energy 33 (from a source not shown) to the joints 7 and 13, thereby causing the integral sealing of lids 6a and 12a to their respective vessels 6b and 12b. It is preferred to seal the inner ceramic container (6a–6b) first and then to assemble the rest of the container system before sealing the second ceramic container (12a–12b).

Figure 4:
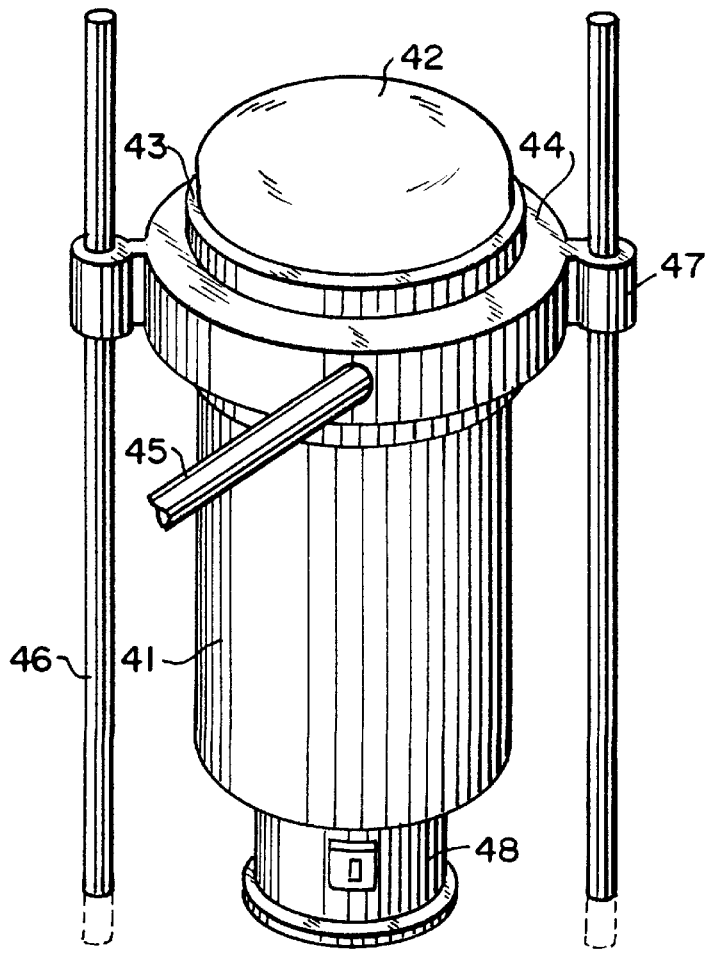
FIG. 4 is a perspective view of the microwave thermal apparatus surrounding the joint area of an exterior set of a ceramic container vessel and lid.

FIG. 4 is a perspective view of a microwave ring furnace similar to the one shown in partial cross section in FIG. 3. FIG. 4 illustrates a microwave ring furnace 44 which provides integral joining of the vessel 41 and lid 42 of the ceramic container and completes the sealing of the container. Container vessel 41 is covered by container lid 42. The joint between vessel 41 and lid 42 is concealed by ring furnace 44. Thermal insulation blanket 43 surrounds the unseen joint. Ring microwave furnace 44 has attached to it microwave waveguide 45. There is preferably another microwave waveguide (not shown) on the rear side of the microwave ring furnace 44. Upright poles 46 on either side support microwave ring furnace 44. Brackets 47, which permit up and down movement of the microwave ring furnace 44, also make possible the horizontal transport of the loaded and assembled container into and out the microwave ring furnace 44. Rotating platform 48 (driven by an electrical motor—not shown) is preferably on a special car (also not shown in FIG. 4) for container transportation and allows its rotation during microwave processing.

In order to limit high temperature heating to the joint area only, the MWTS furnace is preferably constructed as a ring jacket 31 which surrounds the container body at the joint area. This ring jacket 31 may be constructed with a single slidably mounted circular ring or it may be constructed of two movable semicircular parts. This makes possible the movement of the container in and out of the MWTS when the container is delivered to the MWTS working space. The ring of the MWTS furnace may be slidably mounted on vertical rails. To provide uniform and quality thermal treatment, this MWTS furnace preferably has a minimum of two microwave sources, each of which has a different working frequency.

In order to enhance the sealing process, a weight may be loaded on the top of the lid 42 and/or vacuum pumping may be provided either in the microwave furnace chamber 31 or in an additional enclosure which surrounds all apparatus with treated ceramic parts.

The microwave treatment process proceeds in accordance with a thermal schedule tailored to the thickness and ceramic properties of the container walls. After thermal treatment, the car platform holding the container is carefully removed from the MWTS, and it is held in a closed waiting area at ambient temperature for a minimum of 24 hours to provide a cooling process of the container body before any further transportation.

The foregoing specification and drawings have thus described and illustrated a novel process, an apparatus and an interlayer ceramic composition for joining ceramic parts, particularly joining ceramic containers for nuclear waste and their lids, which fulfills all the objects and advantages sought therefor. Many changes, modifications, variations and other uses and applications of the subject invention will, however, become apparent to those skilled in the art after considering this specification which discloses the preferred embodiments thereof. All such changes, modifications, variations and other uses and applications which do not depart from the spirit and scope of the invention are deemed to be covered by the invention, which is to be limited only by the claims which follow.

What is claimed is:

1. A process of joining ceramic parts comprised of silicate materials or oxide ceramics and having a thickness of at least 2.5 cm, which comprises placing the surfaces of the parts together and focusing microwave energy at the joint between the ceramic parts in order to seal the joint by refiring and rereacting the ceramic parts, the microwave energy being of sufficient power and being uniformly applied to the joint for a sufficient period of time to seal the joint.

2. A process for joining ceramic parts having a thickness of at least about 2.5 cm, which comprises:
   a) autoclaving a particulate ceramic composition to increase its hydrogen form contents to a concentration that serves to increase the composition's absorption of microwave energy during its subsequent application to a joint between the ceramic parts,
   b) coating the autoclaved particulate ceramic composition on the surfaces of the ceramic parts to be joined together,
   c) placing the coated surfaces of the parts to be joined together and focusing microwave energy at the joint between the ceramic pans in order to seal the joint by refiring and rereacting the ceramic composition between the ceramic parts, the microwave energy being of sufficient power and being uniformly applied to the joint for a sufficient period of time to seal the joint.

3. The process as claimed in claim 2, wherein the joint is sealed so as to be gas-impermeable.

4. The process as claimed in claim 2, wherein the ceramic parts have a composition selected from the group consisting of silicate materials, kaolin, red clay, mullite, alumina, magnesium oxide, magnesium aluminum spinel, nitride and carbide ceramics, other metal oxides and mixtures thereof.

5. The process as claimed in claim 2, wherein the ceramic parts have a thickness of at least about 5 cm.

6. The process as claimed in claim 2, wherein the ceramic parts are containers and lids therefor formed by extrusion.

7. The process as claimed in claim 2, wherein the ceramic parts are containers and lids therefor formed by vibrocompacting.

8. The process as claimed in claim 2, wherein the particulate ceramic composition is selected from the group consisting of silicate materials, kaolin, red clay, mullite, alumina, magnesium oxide, magnesium aluminum spinel, nitride and carbide ceramics, other metal oxides and mixtures thereof.

9. The process as claimed in claim 2, wherein the particulate ceramic composition contains the same components as the ceramic parts.

10. The process as claimed in claim 2, wherein the particle sizes of the particulate ceramic composition range from fine grain to coarse grain in size.

11. The process as claimed in claim 10, wherein the particle sizes of the particulate ceramic composition are selected in accordance with the porosity of the ceramic parts to be joined.

12. The process as claimed in claim 10, wherein the particle sizes of the particulate ceramic composition range from about 2 nm to about 2 mm.

13. The process as claimed in claim 2, wherein the particulate ceramic composition is subjected to a steam autoclave treatment at a steam pressure of up to about 2.5 GPa for a period of time sufficient to introduce hydrogen forms into the ceramic composition.

14. The process as claimed in claim 2, wherein the microwave energy is provided at one or more frequencies in the range of about 600 MHZ to about 6000 MHZ.

15. The process as claimed in claim 14, wherein the microwave energy is provided at one or more frequencies in the range of about 700 MHZ to about 4000 MHZ.

16. The process as claimed in claim 15, wherein the microwave energy is provided at a frequency of about 915 MHZ or about 2450 MHZ.

17. The process as claimed in claim 15, wherein the microwave energy is provided at both about 915 MHZ and about 2450 MHZ.

18. The process as claimed in claim 2, wherein the ceramic parts together are in the general form of a cylinder or an egg-shape and are together rotated about their axis in step (c).

19. The process as claimed in claim 2, wherein the parts to be joined have matching surfaces at their interface.

20. The process as claimed in claim 19, wherein the matching surfaces at their interfacing edges are flat or beveled.

21. The process as claimed in claim 19, wherein the parts to be joined have mating grooves and ridges at their interfacing edges.

22. The process as claimed in claim 21, wherein the grooves and ridges have a triangular or trapezoidal cross section.

23. The process as claimed in claim 2, wherein the joint between the parts is surrounded by insulation, which in turn is surrounded by a microwave furnace.

24. A process for joining ceramic lids on ceramic vessels, which comprises:
   a) autoclaving a particulate ceramic composition to increase its hydrogen form contents to a concentration that serves to increase the composition's absorption of microwave energy during its subsequent application to a joint between the ceramic parts,
   b) coating the autoclaved ceramic composition on the edges of the lid and the vessel to be joined together,
   c) placing the lid on the vessel and focusing microwave energy at the joint between the lid and the vessel in order to seal the joint by refiring and rereacting the ceramic composition between the vessel and the lid, the microwave energy being of sufficient power and being uniformly applied to the joint for a sufficient period of time to seal the joint.

25. The process as claimed in claim 24, wherein the ceramic parts have a composition selected from the group consisting of silicate materials, kaolin, red clay mullite, alumina, magnesium oxide, magnesium aluminum spinel, nitride and carbide ceramics, other metal oxides and mixtures thereof.

26. The process as claimed in claim 24, wherein the ceramic parts are containers and lids therefor formed by extrusion or vibrocompacting.

27. The process as claimed in claim 24, wherein the ceramic vessels and lids to be joined have matching surfaces at their interfacing edges.

28. The process as claimed in claim 27, wherein there are mating grooves and ridges at the interfacing edges of the ceramic vessels and lids.

29. The process as claimed in claim 28, wherein the grooves and ridges have a triangular or trapezoidal cross section.

30. The process as claimed in claim 27, wherein the matching surfaces at their interfacing edges of the ceramic vessels and lids are flat or beveled.

31. The process as claimed in claim 24, wherein the source of the microwave energy is a microwave ring furnace.

32. The process as claimed in claim 31, wherein the joint between the vessel and the lid is surrounded by ceramic thermal insulation, which in turn is surrounded by the microwave ring furnace.

33. The process as claimed in claim 32, wherein the vessel and the lid are rotated within the microwave ring furnace.

34. The process as claimed in claim 24, wherein the microwave energy is provided at one or more frequencies in the range of about 600 MHZ to about 6000 MHZ.

35. The process as claimed in claim 34, wherein the microwave energy is provided at one or more frequencies in the range of about 700 MHZ to about 4000 MHZ.

36. The process as claimed in claim 35, wherein the microwave energy is provided at a frequency of about 915 MHZ or about 2450 MHZ.

37. The process as claimed in claim 35, wherein the microwave energy is provided at both about 915 MHZ and about 2450 MHZ.

38. An apparatus to join ceramic parts with microwaves which comprises:
   (a) a microwave ring furnace encircling a joint area between ceramic parts having a thickness of at least 2.5 cm. and having a circular cross section,
   (b) at least one microwave guide attached to the microwave ring furnace, and
   (c) a source of microwave energy that is connected to the microwave guide and has sufficient power to join the ceramic parts,
   said microwave ring furnace being slidably mounted to focus the microwave energy on the joint area.

39. An apparatus as claimed in claim 38, wherein the microwave ring furnace is slidably mounted on a pair of vertical rods.

40. An apparatus as claimed in claim 38, wherein the microwave ring furnace is centrally located over a turntable that rotates the container so that the joint area between ceramic parts of the container which have a circular cross section are within the encircling microwave ring furnace.

41. An apparatus as claimed in claim 38, wherein the microwave ring furnace has two microwave guides attached to it.

* * * * *